United States Patent
Suh et al.

(10) Patent No.: US 12,147,349 B2
(45) Date of Patent: Nov. 19, 2024

(54) PROCESSOR AND OPERATION THEREOF TO REVOKE CACHE MEMORY STATES UTILIZING WRITE-BACK BUFFER

(71) Applicant: Korea University Research and Business Foundation, Seoul (KR)

(72) Inventors: Taeweon Suh, Namyangju-si (KR); Gunjae Koo, Namyangju-si (KR); Jongmin Lee, Seoul (KR); Junyeon Lee, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 28 days.

(21) Appl. No.: 18/081,921

(22) Filed: Dec. 15, 2022

(65) Prior Publication Data

US 2023/0185724 A1  Jun. 15, 2023

(30) Foreign Application Priority Data

Dec. 15, 2021 (KR) .......... 10-2021-0179950

(51) Int. Cl.
  *G06F 12/0875* (2016.01)
  *G06F 12/0891* (2016.01)
  *G06F 12/123* (2016.01)

(52) U.S. Cl.
  CPC ...... *G06F 12/0875* (2013.01); *G06F 12/0891* (2013.01); *G06F 12/123* (2013.01)

(58) Field of Classification Search
  CPC .. G06F 9/3842; G06F 9/3861; G06F 11/1471; G06F 12/0802; G06F 12/0804; G06F 12/0859; G06F 12/0875; G06F 12/0891; G06F 12/0895; G06F 12/0897; G06F 12/123; G06F 12/126; G06F 2212/1024; G06F 2212/1052
  See application file for complete search history.

(56) References Cited

U.S. PATENT DOCUMENTS

| | | | |
|---|---|---|---|
| 10,394,716 | B1 | 8/2019 | Piry et al. |
| 10,956,206 | B2 | 3/2021 | Payet et al. |
| 2004/0078559 | A1* | 4/2004 | Katayama ............. G06F 9/3861 712/E9.05 |
| 2012/0144126 | A1 | 6/2012 | Nimmala et al. |
| 2015/0278097 | A1 | 10/2015 | Kelm et al. |
| 2017/0090941 | A1* | 3/2017 | Eisen .................. G06F 12/0897 |

OTHER PUBLICATIONS

Korean Office Action issued on Mar. 20, 2024, in counterpart Korean Patent Application No. 10-2021-0179950 (4 pages in English, 4 pages in Korean).

* cited by examiner

*Primary Examiner* — Aracelis Ruiz

(74) *Attorney, Agent, or Firm* — NSIP Law

(57) ABSTRACT

Disclosed is a processor for performing a speculative execution for an out-of-order execution. The processor may include: a core; and an L1 cache memory, and the core may include a speculative track buffer (STB) storing speculative track information in order to track the speculative instruction when a speculative instruction is recorded in a reorder buffer (ROB), and a load queue (LQ) transmitting a commit doorbell signal or a restore doorbell signal for a first speculative block to which a first speculative instruction belongs to an L1 cache memory based on first speculative track information of the first speculative instruction when a speculative success or a speculative failure of the first speculative instruction included in the speculative instruction is decided, and the L1 cache memory may include a write buffer.

12 Claims, 7 Drawing Sheets

PROCESSOR AND OPERATION THEREOF TO REVOKE CACHE MEMORY STATES UTILIZING WRITE-BACK BUFFER

CROSS-REFERENCE TO RELATED APPLICATIONS

This application claims priority to and the benefit of Korean Patent Application No. 10-2021-0179950 filed in the Korean Intellectual Property Office on Dec. 15, 2021, the entire contents of which are incorporated herein by reference.

TECHNICAL FIELD

The present disclosure relates to a processor having an architecture for defending an attack utilizing a timing side-channel of a cache memory, and particularly, to a process having an architecture for defending a transient execution attack of leaking data of the cache memory utilizing speculative execution for out-of-order execution, and an operation thereof.

BACKGROUND ART

Transient execution attacks such as spectre and meltdown are security attack schemes utilizing architectural vulnerabilities of a processor which have recently been discovered. For example, the transient execution attack is an attack method that steals secret data by using speculative execution of an outer-of-order (OoO) processor and a timing side-channel of the cache memory, which is currently widely used. An attacker manipulates a predictive branch destination in order to access the secret data by using a speculatively executed data load instruction. For example, in the case of Spectre-NG, a predictive store avoidance scheme is used for manipulating the predictive branch destination. The attacker may interpret secret information left in a cache through a cache side-channel attack. A Prime+Probe scheme is a scheme that detects a block evicted due to the secret data among preconfigured cache blocks. On the contrary, a Flush+Reload scheme is a scheme that detects information updated in the cache by a prediction load instruction accessing the secret data. Consequently, most transient execution attacks use a cache state changed by the prediction load instruction.

Intel developed a patch capable of solving meltdown in cooperation with Amazon Web Services (AWS), Microsoft (MS), Google, and Red Hat. The patch deactivates an outer-of-order instruction processing technology which becomes a problem. However, as the out-of-order instruction processing technology is deactivated in order to solve the meltdown problem, there is a problem in that the performance of a CPU deteriorates. The outer-of-order instruction processing is a core of a central processing unit technology. According to the UK's IT magazine register, it is presented that the outer-of-order instruction processing is deactivated, and as a result, the performance of the Intel CPU can be degraded up to 30%.

Write-Back Buffer (WBB) is a data buffer that temporarily stores data which should be updated by a low level cache as disclosed in Korean Patent Application No. 1995-0014663. When a write instruction delivered at a low level is performed without the write-back buffer, an operation of the cache may be interfered in a case in which the low-level cache cannot process a write request. The write-back buffer is used in most processors, and is present as various forms by coupling to a write-combining buffer or a line-fill buffer. The write-back buffer is a required element for operating while a cache operation is not interfered, but as an observation result, a utilization rate of the write-back buffer is low.

The present disclosure has been made in an effort to present an architectural solving method for effectively defending transient execution attacks by utilizing remaining spaces which are not utilized in the write-back buffer as a space for restoring a state of the cache memory according to speculative execution.

SUMMARY OF THE INVENTION

The present disclosure has been made in an effort to provide a processor capable of effectively defending a transient execution attack more quickly and with lower cost than an existing software scheme through an architectural change of the processor and the resulting cache memory state restoring operation.

An exemplary embodiment of the present disclosure provides a processor for performing a speculative execution for an out-of-order execution. The processor may include: a core; and an L1 cache memory, and the core may include a speculative track buffer (STB) storing speculative track information in order to track the speculative instruction when a speculative instruction is recorded in a reorder buffer (ROB), and a load queue (LQ) transmitting a commit doorbell signal or a restore doorbell signal for a first speculative block to which a first speculative instruction belongs to an L1 cache memory based on first speculative track information of the first speculative instruction when a speculative success or a speculative failure of the first speculative instruction included in the speculative instruction is decided, and the L1 cache memory may include a write buffer, and the write buffer may store an evicted cache block evicted from a tag and data area of the L1 cache memory as a request generated by the speculative instruction is returned to the L1 cache memory, and may perform a commit operation or a restore operation for the evicted cache block corresponding to the first speculative block when receiving a commit doorbell signal or a restore doorbell signal for the first speculative block.

Alternatively, the write buffer may set speculative instruct eviction information (SPE), state data information, and replacement address information of the evicted cache block when storing the evicted cache block.

Alternatively, when the speculative failure of the first speculative instruction is decided, the load queue may transmit a restore doorbell signal including address values of one or more speculative instructions included in the first speculative block to the L1 cache memory.

Alternatively, the write buffer may decide a restored cache block corresponding to the address values of one or more speculative instructions included in the first speculative block among the evicted cache blocks when receiving the restore doorbell signal of the first speculative instruction, and restore the restored cache block to the tag and data area based on the replacement address information of the restored cache block.

Alternatively, the L1 cache memory may store an updated cache block returned to the L1 cache memory in a location of the cache block evicted from the tag and data area of the L1 cache memory according to the request generated by the speculative instruction, set speculative instruction update information (SPI) for the updated cache block, replace the updated cache block corresponding to the replacement address information of the restored cache block with the restored cache block in order to restore the restored cache block to the tag and data area when receiving the restore doorbell signal for the first speculative block, and release the SPI of the restored cache block.

Alternatively, the L1 cache memory may include a miss status holding register (MSHR) setting squash information (SQ) for the first speculative instruction when the request generated by the first speculative instruction is not returned to the L1 cache memory at the time of receiving the restore doorbell signal of the first speculative instruction.

Alternatively, the MSHR may ignore the request returned by the first speculative instruction when the SQ for the first speculative instruction is set.

Alternatively, when the speculative success of the first speculative instruction is decided, the speculative track buffer may decide whether a valid bit of the first speculative instruction is set when receiving a commit signal for the first speculative instruction from the reorder buffer, and transmits identification information of the first speculative instruction to the load queue when the valid bit of the first speculative instruction is set, and the load queue may transmit the commit doorbell signal including the address values of one or more speculative instructions included in the first speculative block to the L1 cache memory when receiving the identification information of the first speculative instruction.

Alternatively, the load queue may transmit the commit doorbell signal when speculative instruction load information (SPL) of one or more speculative instructions included in the first speculative block is set.

Alternatively, the write buffer may decide the committed cache block corresponding to the address values of one or more speculative instructions included in the first speculative block among the evicted cache blocks when receiving the commit doorbell signal of the first speculative instruction, and the L1 cache memory may release the SPI of an updated cache block at the location of the tag and data area corresponding to the replacement address information of the committed cache block.

Alternatively, the write buffer may invalidate the committed cache block when state data of the committed cache block is set to 'clean' or release the SPE of the committed cache block when the state data of the committed cache block is set to 'dirty'.

Alternatively, the write buffer may be a write-back buffer.

According to an exemplary embodiment of the present disclosure, a processor can be provided, which effectively defends a transient execution attack quickly and with low cost by structurally restoring a changed state of a cache memory by a prediction instruction by utilizing a write-back buffer having a low utilization rate as a restoring buffer.

DETAILED DESCRIPTION

Figure 1:
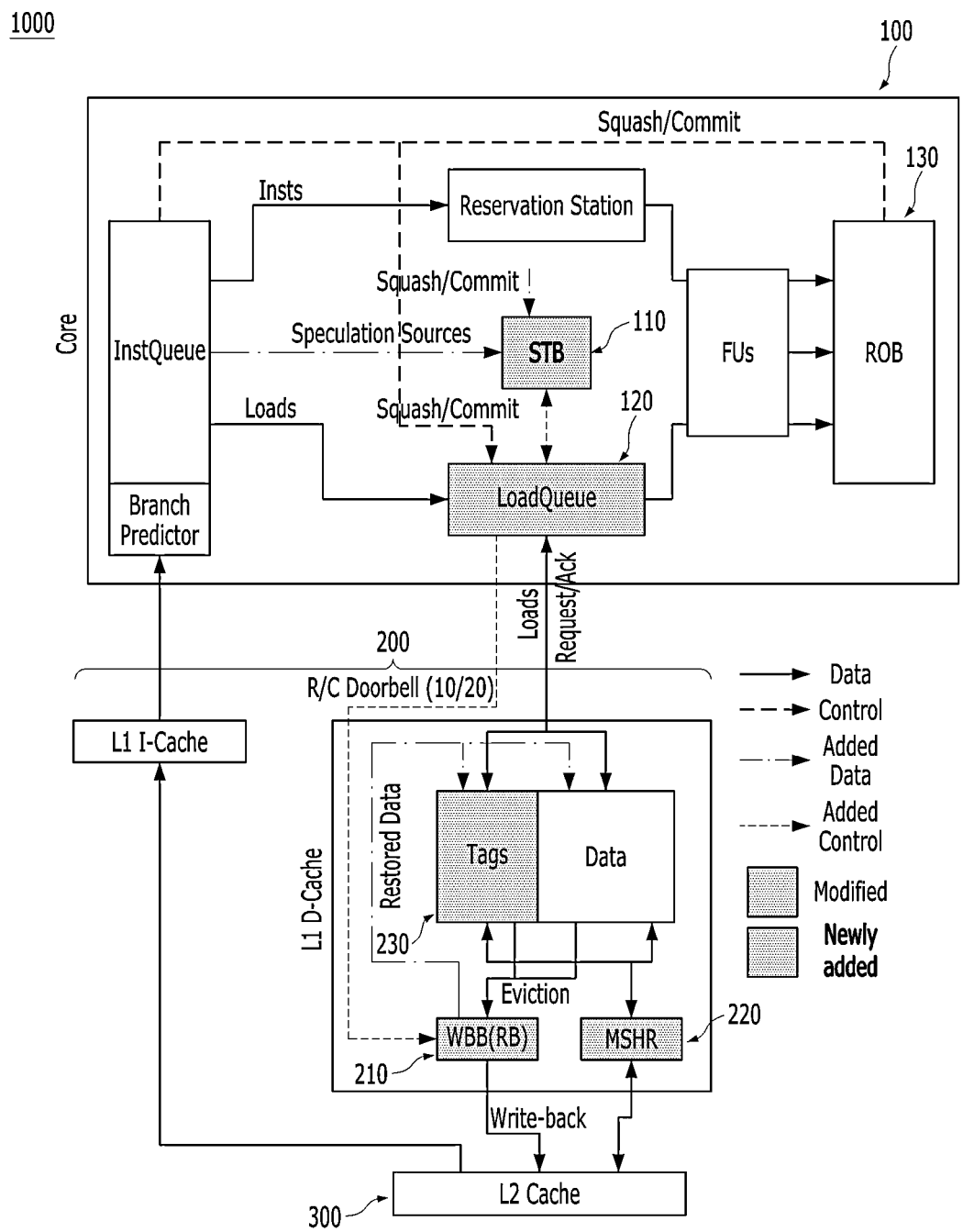
FIG. 1 illustrates a schematic architecture of a processor according to some exemplary embodiments of the present disclosure.

Various exemplary embodiments will now be described with reference to drawings. In the present specification, various descriptions are presented to provide appreciation of the present disclosure. However, it is apparent that the exemplary embodiments can be executed without the specific description.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled technicians may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

Transient execution attacks such as spectre and meltdown are security attack schemes utilizing structural vulnerabilities of a processor which have recently been discovered. Specifically, the transient execution attack is an attack method that steals secret data by using speculative execution of an outer-of-order (OoO) processor and a timing side-channel of the cache memory, which is currently widely used.

The present disclosure proposes an efficient and light-weight defense technique for preventing the transient execution attack. In a processor and memory state restoring method proposed by the present disclosure, a cache block evicted during speculative execution may be temporarily kept by improving a write buffer (in particular, write-back buffer) having a low utilization rate. When the speculative execution is unsuccessful, data which is temporarily stored in the write-back buffer may be restored to a main cache (e.g., L1 cache memory). Two advantages may be obtained by using the write-back buffer as the restore buffer. In a first advantage, the write-back buffer is positioned close to an L1 cache to reduce performance deterioration which occurs upon restoring. In a second advantage, since an additional memory buffer is not used for restoring, an additional memory area is not required for implementation.

FIG. 1 illustrates a schematic architecture of a processor 1000 according to some exemplary embodiments of the present disclosure.

According to some exemplary embodiments of the present disclosure, the processor 1000 that performs a speculative execution for an outer-of-order execution may include various components illustrated in FIG. 1. For example, according to some exemplary embodiments of the present disclosure, the processor 1000 may include a core 100, L1 cache memories 200 and 300, and an L2 cache memory 400. A configuration of the processor 1000 and components included in the processor 1000 illustrated in FIG. 1 is only an example shown through simplification. The processor 1000 may include various components for defending the transient execution attack according to some exemplary embodiments of the present disclosure, and only some of the disclosed components may also constitute the processor 1000 and the components included in the processor 1000.

The out-of-order execution (also referred to as OoOE or out-of-order instruction processing) may be a paradigm that intends to use an instruction cycle in which a central processing unit may be wasted due to a specific type of delay. The out-of-order execution may be a technique that does not process an instruction according to an order so as to increase instruction execution efficiency.

An architecture of the core 100 for the out-of-order execution may include various components for allowing instructions which are executed in an out-of-order to correctly update an architectural state of the core according to an original program order. As described above, the core 100 may be constituted by various components in addition to the components illustrated in FIG. 1.

The speculative execution may mean various techniques that process the instruction to achieve a better performance based on a speculation in the out-of-order execution. For example, the speculative execution may be a technique that previously performs an instruction which is not determined based on the speculation, and invalidates an already processed instruction if a result value is different from a speculation value.

According to some exemplary embodiments of the present disclosure, referring to FIG. 1, the core 100 may include an integrated reservation station, a instruction queue (InstQue), a branch predictor, a function unit (FU), a load queue (LQ), and a speculative track buffer (STB). As described above, the architecture of the core 100 illustrated in FIG. 1 is just an example, and the core 100 may have various mechanisms in order to implement the speculative execution for the out-of-order execution.

The L1 cache memory 200 may include an L1 I-cache for the instruction and an L1 D-cache for the data. The term "L1 cache memory" used throughout the specification and the claims of the present disclosure is generally used to refer to the L-1 D-cache. However, the term "L1 cache memory" may refer to the L1 I-cache or a cache memory including the L1 I-cache and the L1 D-cache, and other L1 cache memories having various structures.

The L1 cache memory 200 may include a write-back buffer 210, a miss status holding register (MSHR) 220, and a tag and data area 230 storing the cache blocks and the tags of the cache blocks. As described above, the architecture of the L1 cache memory 200 illustrated in FIG. 1 is just an example, and the L1 cache memory 200 may have various mechanisms in order to implement the speculative execution for the out-of-order execution.

Here, the write buffer 210 may be the write-back buffer. However, the present disclosure is not limited thereto and the write buffer may include various types of buffers. For example, the write buffer may be a write-through buffer. The term "write buffer" used throughout the specification and the claims of the present disclosure is generally used to refer to the write buffer 210 which is the write-back buffer. However, the present disclosure is not limited thereto and the "write buffer" may include various types of buffers and a combination thereof.

Referring to FIG. 1, when transformed components are described as compared with the conventional processor architecture, the transformed components are represented to have a point pattern. Further, a dotted line and an alternate long and short dash line represent a data path and a signal path for restoring a cache memory state. For example, since the write buffer 210 is used as the restore buffer, a path of data which is restored to the tag and data area of the L1 cache memory 200 from the write buffer 210 may be added. A restore/commit doorbell signal may be used for determining whether to restore or evict the cache block stored in the write buffer 210. In order to generate an appropriate restore/commit doorbell signal, the processor 1000 may include a speculative track buffer (STB) for tracking the speculative instruction.

According to some exemplary embodiments of the present disclosure, the processor 1000 that performs the speculative execution for the out-of-order execution may cancel all instructions after the speculative execution is made when the speculative execution is unsuccessful. In this case, the processor 1000 may restore the state change of the cache memory updated by the cancelled speculative instruction. To this end, as described below, the processor 1000 may include components described below, and the component of the processor 1000 may perform the following operation.

According to some exemplary embodiments of the present disclosure, the core 100 may include the speculative track buffer (STB) 110 storing speculative track information in order to track the speculative instruction when the speculative instruction is allocated to a reorder buffer (ROB) 130. Further, the core 100 may include the load queue (LQ) 120 transmitting a commit doorbell signal or a restore doorbell signal for a first speculative block to which a first speculative instruction belongs to the L1 cache memory 200 based on first speculative track information of the first speculative instruction when a speculative success or a speculative failure of the first speculative instruction included in the speculative instruction is decided.

The speculative track buffer 110 may store speculative track information in order to track the speculative instruction allocated to the reorder buffer 130 when the speculative instruction is allocated to the reorder buffer 130. The reorder buffer 130 as a structure storing a decoded instruction according to a program order may commit an instruction of completing an operation in an original order. To this end, each instruction may be allocated to an entry of the reorder buffer 130 in the original order in a dispatch step before the out-of-order execution is performed. All executed instructions may be allocated to the entry of the reorder buffer 130 until committed on a pipeline after completing the operation.

When the speculative success is decided for the speculative execution for any one speculative instruction, the core 100 may commit the speculative instruction of the speculative success, and perform a commit operation for the speculative instruction of the speculative success. For convenience, any one speculative instruction in which the speculative success or the speculative failure is decided may be referred to as the first speculative instruction. In this case, the core 100 may commit the first speculative instruction of the speculative success as a non-speculative instruction. The core 100 may transmit the commit doorbell signal to the cache memory (e.g., the L1 cache memory 200) through the load queue 120 so as to commit a change state generated on the cache memory by the first speculative instruction before the speculative success. Specially, the load queue 120 may decide the speculative block to which the speculative instruction of the speculative success belongs by using the speculative track information of the first speculative instruction stored in the speculative track buffer. The speculative block may be a set of one or more speculative instructions based on any one speculative instruction. In other words, the speculative block may refer to one or more instructions speculatively executed according to any one speculative instruction. For convenience, the speculative block to which the first speculative instruction belongs may be referred to as the first speculative block. In this case, the first speculative block may be a set of one or more speculative instructions based on the first speculative instruction.

The processor 1000 may generate a commit signal for the first speculative block to which the first speculative instruction belongs when a result of the speculative execution for the first speculative instruction is decided. As a result, the processor 1000 according to the present disclosure may have an advantage of being capable of processing the speculative instruction without waiting until a specific load instruction is committed in the reorder buffer 130.

The load queue 120 may transmit the commit doorbell signal to the L1 cache memory 200 so as to commit the state change of the L1 cache memory 200 by the speculative block based on the first speculative instruction. In this case, as described below, the write buffer 210 of the L1 cache memory 200 may safely commit the evicted cache block by the speculative instruction of the speculative success.

According to some exemplary embodiments of the present disclosure, the write buffer 210 may store an evicted cache block evicted from the tag and data area 230 of the L1 cache memory 200 as the request generated by the speculative instruction is returned to the L1 cache memory. Further, the write buffer 210 may perform a commit operation or a restore operation for the evicted cache block corresponding to the first speculative block when receiving the commit doorbell signal or the restore doorbell signal for the first speculative block.

Specifically, the request generated by the speculative instruction may be a request for checking whether data to be referred to by the core 100 is stored in the cache memory in order to perform the speculative instruction. A cache hit of the L1 cache memory 200 may mean a case where the data to be referred to by the core 100 is present in the L1 cache memory 200 according to the request generated by the speculative instruction. Further, a cache miss of the L1 cache memory 200 may mean a case where the data to be referred to by the core 100 is not present in the L1 cache memory 200 according to the request generated by the speculative instruction. When the cache miss occurs, the L1 cache memory 200 may request relevant data to a low-level cache (e.g., L2 cache memory 300), a memory, or a disk. As the cache miss of the L1 cache memory 200 occurs, the L1 cache memory 200 may transmit the request generated by the speculative instruction to the low-level cache, the memory, or the disk, and as a result, the request generated by the speculative instruction may be returned from the low-level cache, the memory, or the disk again. As the request generated by the speculative instruction is returned, the data received from the low-level cache, the memory, or the disk may be stored in a data area of the L1 cache memory 200. The data may be referred to as an updated cache block for convenience. In general, since the L-1 cache memory 200 has a comparatively small capacity, some data previously stored in the data area may be evicted to store the updated cache block. The evicted data may be referred to as the evicted cache block for convenience. The evicted cache block may be stored in the write buffer 210 serving as the restore buffer.

The write buffer 210 may perform the commit operation for the evicted cache block corresponding to the first speculative block when receiving the commit doorbell signal for the first speculative block transmitted by the load queue 120. Here, the commit operation may include an operation of updating the evicted cache block corresponding to the first speculative block to the low-level cache or deleting (invalidating) the evicted cache block according to the state of the cache block. The restore operation for the evicted cache block corresponding to the first speculative block is described in relation to the case where the speculative failure is decided for the speculative execution described below.

When the speculative failure is decided for the speculative execution for any one speculative instruction, the core 100 may squash the speculative instruction of the speculative failure, and perform the restore operation for the speculative instruction of the speculative failure. For example, the reorder buffer 130 may remove the speculative instruction of the speculative failure from the entry. In this case, the core 100 may transmit the restore doorbell signal to the cache memory (e.g., the L1 cache memory 200) through the load queue 120 so as to restore the change state generated on the cache memory by the speculative instruction. Specifically, similarly to the case of the speculative success, the load queue 120 may decide the speculative block to which the speculative instruction of the speculative failure belongs by using the speculative track information stored in the speculative track buffer. For convenience, similarly to an example described in relation to the speculative success, the speculative instruction in which the speculative failure is decided may be referred to as the first speculative instruction and the speculative block to which the first speculative instruction belongs may be referred to as the first speculative block.

The load queue 120 may transmit the restore doorbell signal to the L1 cache memory 200 so as to restore the state change of the L1 cache memory 200 by the speculative block based on the first speculative instruction. In this case, the L1 cache memory 200 may invalidate the updated cache block in the data area of the L1 cache memory 200 by the first speculative instruction of the speculative failure. In addition, the write buffer 210 may perform the restore operation for the evicted cache block corresponding to the first speculative block. For example, as evicted by the first speculative instruction of the speculative failure, the evicted cache block stored in the write buffer 210 may be restored to an original location of the data area of the cache memory again. Therefore, the write buffer 210 may be used as the restore buffer temporarily keeping the evicted cache block. As described above, the write buffer 210 such as the write-back buffer is used as the restore buffer to obtain two advantages. In a first advantage, the write buffer 210 is positioned close to the data area of the L1 cache memory 200 to reduce performance deterioration which occurs upon restoring. In a second advantage, since an additional memory buffer is not used for restoring, an additional memory area is not required for implementation.

Figure 2:
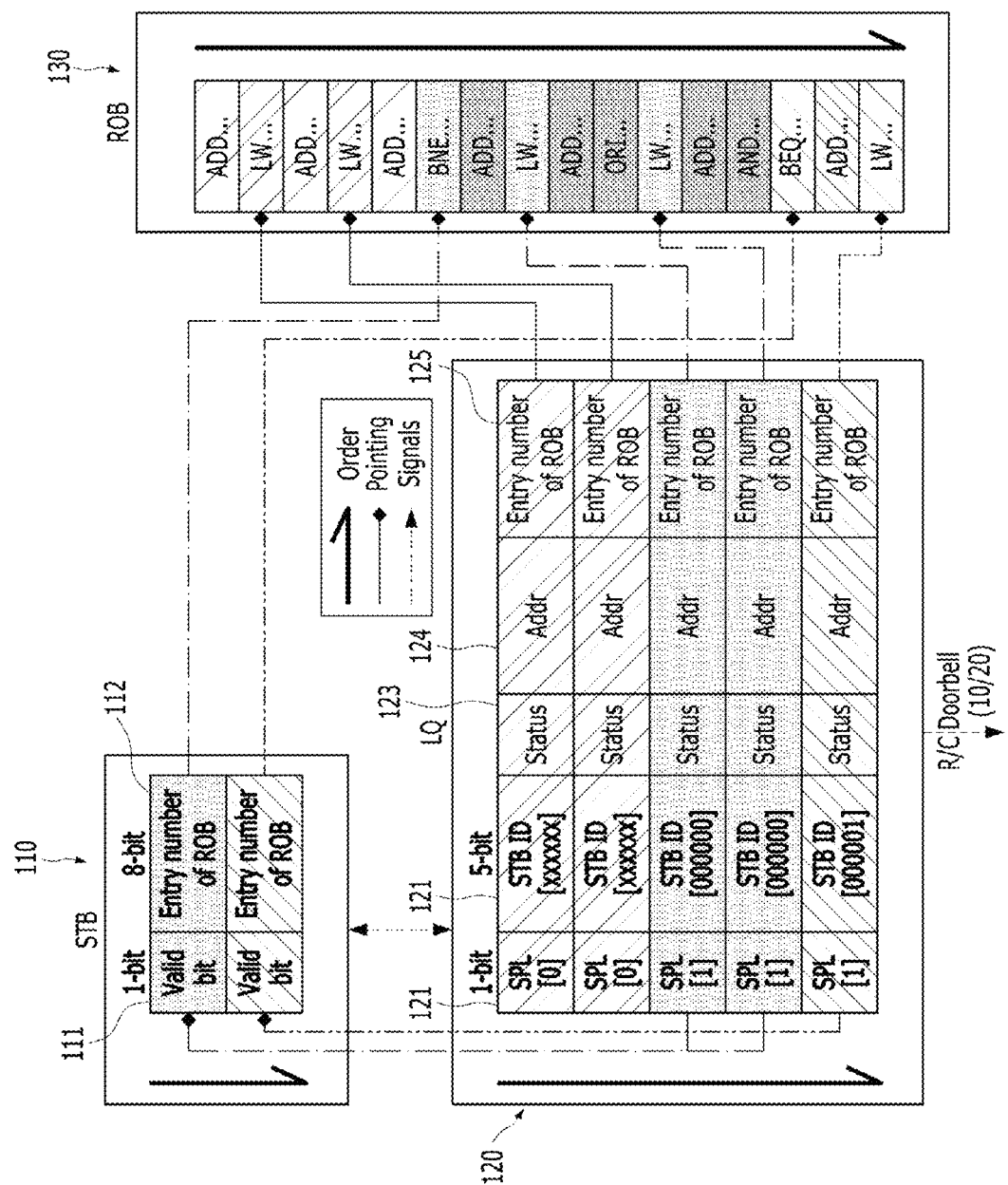
FIG. 2 illustrates a schematic architecture of a core of the processor according to some exemplary embodiments of the present disclosure.

FIG. 2 illustrates a schematic architecture of a core 100 and an operation thereof according to some exemplary embodiments of the present disclosure.

Hereinafter, referring to FIG. 2, an improved architecture of the core 100 of the processor 1000 according to some exemplary embodiments of the present disclosure and an operation thereof will be described in detail. Further, referring to FIG. 2, an example of generating the restore/commit doorbell by utilizing the speculative track buffer 110, the load queue 120, and the reorder buffer 130 on the core 100 will be described in detail.

As described above, the core 100 may transmit a restore/commit doorbell signal 10/20 for starting the restore operation or the commit operation on the L1 cache memory to the L1 cache memory 200 through the load queue 120. As described above, the core 100 may include the speculative track buffer 110 tracking the speculative instruction in order to transmit the restore/commit doorbell signal 10/20 at an appropriate time according to the result of the speculative execution.

The speculative track buffer 110 may store speculative track information in order to track the speculative instruction when the speculative instruction is allocated to the reorder buffer (ROB) 130. The speculative track buffer 110 may be a circulation buffer that tracks the speculative instruction such as a branch instruction, for example. When a specific operation is described with reference to FIG. 2, when an instruction 'BNE' is allocated onto the reorder buffer, the speculative track information for the instruction 'BNE' may be stored in the entry of the speculative track buffer 110. The speculative track information may include various information for tracking the speculative instruction. For example, as illustrated in FIG. 2, the speculative track information may include a valid bit 111 indicating whether the speculative instruction is valid and an entry number 112 on the reorder buffer 130 of the speculative instruction. Similarly to the exemplary embodiment described in FIG. 2, the speculative block to which the first speculative instruction belongs may be referred to as the first speculative block. When described with reference to FIG. 2, the speculative instruction which belongs to the speculative block is represented to have the same pattern. For example, when the first speculative instruction is 'BNE', the first speculative block based on 'BNE' is represented by a light point pattern. As another example, when the first speculative instruction is 'BEQ', the first speculative block based on 'BEQ' is represented to have a diagonal pattern of the same direction. Since the speculative track information includes an entry number 112 on the reorder buffer of the first speculative instruction, when the result of the speculative execution of the first speculative instruction is decided, the load queue 120 may identify the first speculative block allocated onto the load queue 120 by using the entry number 112 on the reorder buffer of the first speculative instruction as identification information of the first speculative instruction.

According to some exemplary embodiments of the present disclosure, the entry of the load queue 120 may further include an area storing speculative instruction load information (SPL) 121 and speculative instruction track identification information (STB ID) 122 for association with the speculative track buffer as compared with the conventional processor architecture. The speculative instruction load information (SPL) may be a value indicating whether the speculative instruction becomes the non-speculative instruction according to the result of the speculative execution. For example, when the speculative instruction is allocated to the load queue 120, the speculative instruction load information (SPL) may be set in order to represent that the result of the speculative execution is not yet decided (for example, the speculative instruction load information (SPL) has a 1 bit value of '1'). Thereafter, when the result of the speculative instruction is decided as the speculative success, the speculative instruction load information (SPL) may be released in order to commit the speculative instruction as the non-speculative instruction (for example, the speculative instruction load information (SPL) has a 1 bit value of '0').

The speculative instruction track identification information (STB ID) 122 may be used for deciding the speculative block by the load queue 120. For example, the entry of the load queue 120 having the same speculative instruction track identification information 122 may belong to the same speculative block. Referring to FIG. 2, first and second entries of the load queue 120 having the diagonal pattern of the same direction may belong to the same speculative block. In this case, the first and second entries of the load queue 120 may have the same speculative instruction track identification information (STB ID). As another example, third and fourth entries of the load queue 120 having the same point pattern may belong to the same speculative block. In this case, the third and fourth entries of the load queue 120 may have the same speculative instruction track identification information (STB ID).

Hereinafter, specific operations of generating the restore doorbell signal 10 and the commit doorbell signal 20 as the speculative success or the speculative failure of the first speculative instruction is decided will be described.

According to some exemplary embodiments of the present disclosure, when the speculative failure of the first speculative instruction is decided, the load queue 120 may transmit the restore doorbell signal 10 including address values of one or more speculative instructions included in the first speculative block to the L1 cache memory 200.

Specifically, when the speculative failure of the first speculative instruction is decided, instructions (i.e., first speculative block) dispatched after the first speculative instruction may be evicted on the reorder buffer 130. In this case, the instructions evicted from the reorder buffer 130 may be evicted jointly even in the speculative track buffer 110 and the load queue 120. For example, referring to FIG. 2, when the speculative failure of the first speculative instruction which is 'BNE' is decided, instructions executed after 'BNE' may be evicted (or invalidated) in the speculative track buffer 110 and the load queue 120. The load queue 120 may transmit the restore doorbell signal 10 for the first speculative block to the L1 cache memory 200 so as to restore the state change generated on the L1 cache memory 200 by the invalidated first speculative block. The restore doorbell signal 10 for the first speculative block may include address values 124 of one or more speculative instructions which belong to the first speculative block. In this case, as described below, the L1 cache memory 200 may decide the restore cache block restored from the write buffer 210 to the data area of the L1 cache memory 200 by using the address value 124 of the speculative instruction included in the restore doorbell signal 10. Hereinafter, the case where the speculative success of the first speculative instruction is decided will be described.

According to some exemplary embodiments of the present disclosure, when the speculative success of the first speculative instruction is decided, the speculative track buffer 110 may decide whether the valid bit of the first speculative instruction is set when receiving the commit signal for the first speculative instruction from the reorder buffer 130, and transmit the identification information of the first speculative instruction to the load queue 120 when the valid bit of the first speculative instruction is set. The load queue 120 may transmit the commit doorbell signal including the address values of one or more speculative instructions included in the first speculative block to the L1 cache memory 200 when receiving the identification information of the first speculative instruction.

Specifically, when the speculative success of the first speculative instruction is decided, the core 100 may commit the speculative instruction included in the first speculative block to which the first speculative instruction belongs as the non-speculative instruction. In this case, the speculative track buffer 110 may receive the commit signal for the first speculative instruction from the reorder buffer 130. The commit signal for the first speculative instruction may include, for example, an index number of the first speculative instruction. In this case, the speculative track buffer 110 compares the index number of the first speculative instruction with the entry number 112 on the reorder buffer 130 of the speculative instructions included in the speculative track information to search the speculative track information for the first speculative instruction. When the speculative track information for the first speculative instruction is searched, the speculative track buffer 110 may identify whether the valid bit 111 of the speculative track information for the first speculative instruction is set (e.g., has the 1 bit value of '1'). When the valid bit is set, the speculative track buffer 110 may transmit the identification information of the first speculative instruction to the load queue 120. Here, the identification information of the speculative instruction may include the entry number 112 on the reorder buffer 130 of the first speculative instruction. On the contrary, when the valid bit is not set (e.g., has the 1 bit value of '0'), the speculative track buffer 110 may not transmit the identification information of the first speculative instruction to the load queue 120.

When the load queue 120 receives the identification information of the first speculative instruction, the load queue 120 may decide the first speculative block stored in the load queue 120 by using the identification information of the first speculative instruction. In addition, the load queue 120 may transmit the commit doorbell signal 20 for the speculative instruction included in the first speculative block to the L1 cache memory 200. In this case, the L1 cache memory 200 may commit the change state of the cache memory by the first speculative block as described below. Here, the commit doorbell signal may include the address values 124 of one or more speculative instructions included in the first speculative block. The address value 124 of the speculative instruction may be used for deciding a commit cache block to be committed among the cache blocks stored in the write buffer 210.

According to some exemplary embodiments of the present disclosure, the load queue 120 may transmit the commit doorbell signal 20 when the speculative instruction load information (SPL) of one or more speculative instructions included in the first speculative block is set.

Specifically, when the speculative instruction load information (SPL) is released, the speculative instruction is already committed as the non-speculative instruction, so the load queue 120 need not transmit the commit doorbell signal for the instruction in which the speculative instruction load information (SPL) is released in the first speculative block. Therefore, the load queue 120 may identify the speculative instruction load information (SPL) of the first speculative block, and then transmit the commit doorbell signal 20 for the instruction in which the speculative instruction load information (SPL) is set.

Figure 3:
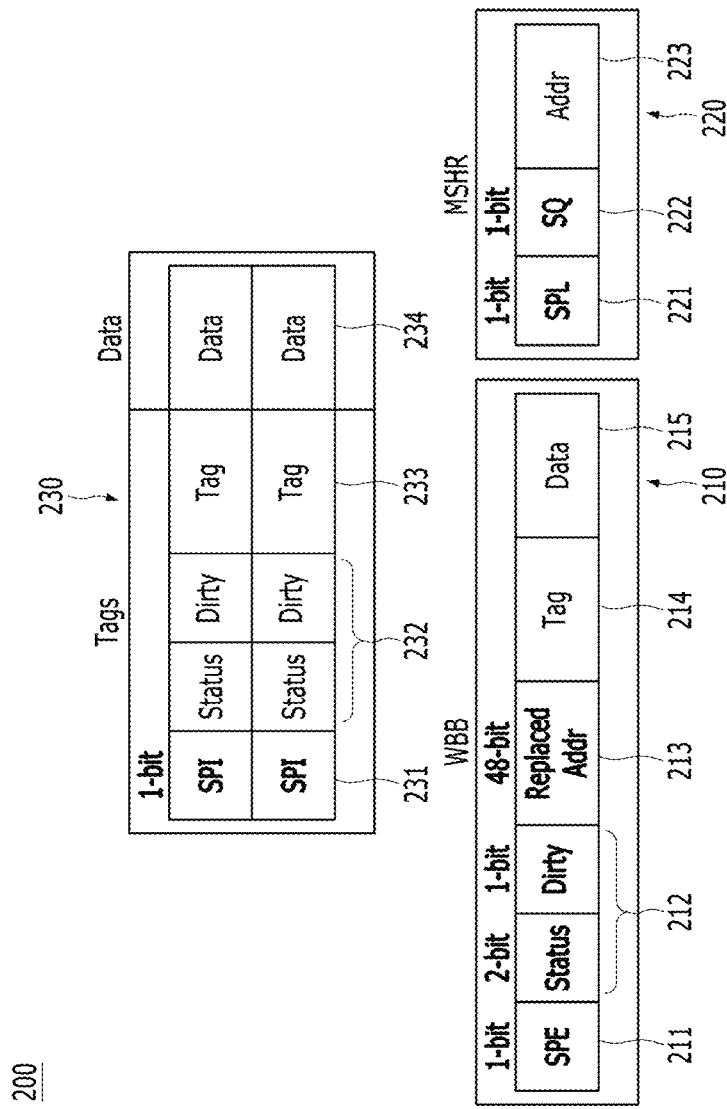
FIG. 3 illustrates a schematic architecture of an L1 cache memory of the processor according to some exemplary embodiments of the present disclosure.

FIG. 3 illustrates a schematic architecture of the L1 cache memory 200 of the processor 1000 according to some exemplary embodiments of the present disclosure.

Hereinafter, referring to FIG. 3, the improved architecture of the L1 cache memory 200 of the processor 1000 according to some exemplary embodiments of the present disclosure and an operation thereof will be described in detail.

According to some exemplary embodiments of the present disclosure, referring to FIG. 3, among the components of the L1 cache memory 200, added components compared to the conventional processor architecture are represented by a boldface type. Specifically, the MSHR 220 may further include an area storing the speculative instruction load information (SPL) and the squash information (SQ) in the entry. The speculative instruction load information (SPL) of the MSHR 220 may be information indicating whether the request generated by the speculative instruction is committed by the non-speculative instruction when transmitting the request generated by the speculative instruction to the low-level cache, the memory, or the disk according to the cache miss. The squash information (SQ) may be used for ignoring the request returned thereafter in order to prevent dual processing when receiving the restore doorbell signal before returning the request generated by the speculative instruction to the L1 cache memory 200.

According to some exemplary embodiments of the present disclosure, the write buffer 210 may set speculative instruction evict information (SPE) 211, state data 212, and replacement address information 213 of the evicted cache block when storing the evicted cache block.

As described above, the write buffer 210 may evict some data stored in the data area in order to store the updated cache block when the cache miss occurs. The evicted data may be referred to the evicted cache block for convenience. The evicted cache block may be stored in the write buffer 210 serving as the restore buffer as described above. According to some exemplary embodiments of the present disclosure, the write buffer 210 is transformed to support the restore operation of the evicted cache block. Specifically, the write buffer 210 may further include an area setting the speculative instruction evict information (SPE), the state data, and the replacement address information 213 in the entry. The speculative instruction evict information (SPE) may indicate that the evicted cache block is not committed by the commit operation. For example, the speculative instruction eviction information (speculative evicted (SPE) may be set when the evicted cache block is stored in the write buffer 210. Further, the SPE may be released when receiving the commit doorbell signal for the evicted cache block in order to commit the speculative instruction as the non-speculative instruction. The state data 212 and the replacement address information 213 may be used for the restore operation or the commit operation of the evicted cache block as described below. The state data 212 and the replacement address information 213 may be replicated from the tag and data area 230 when the evicted cache block is stored in the write buffer 210. The tag and data area 230 may further include an area for setting speculative instruction update information (SPI) 231 for the updated cache block. The SPI 231 may be information indicating that the evicted cache block is stored in the write buffer 210 in order to store the updated cache block. The SPI 231 may be released when committing the memory state change as described below.

Hereinafter, referring to FIGS. 4 to 6, the commit operation and the restore operation of the evicted cache block on the L1 cache memory will be described.

Figure 4:
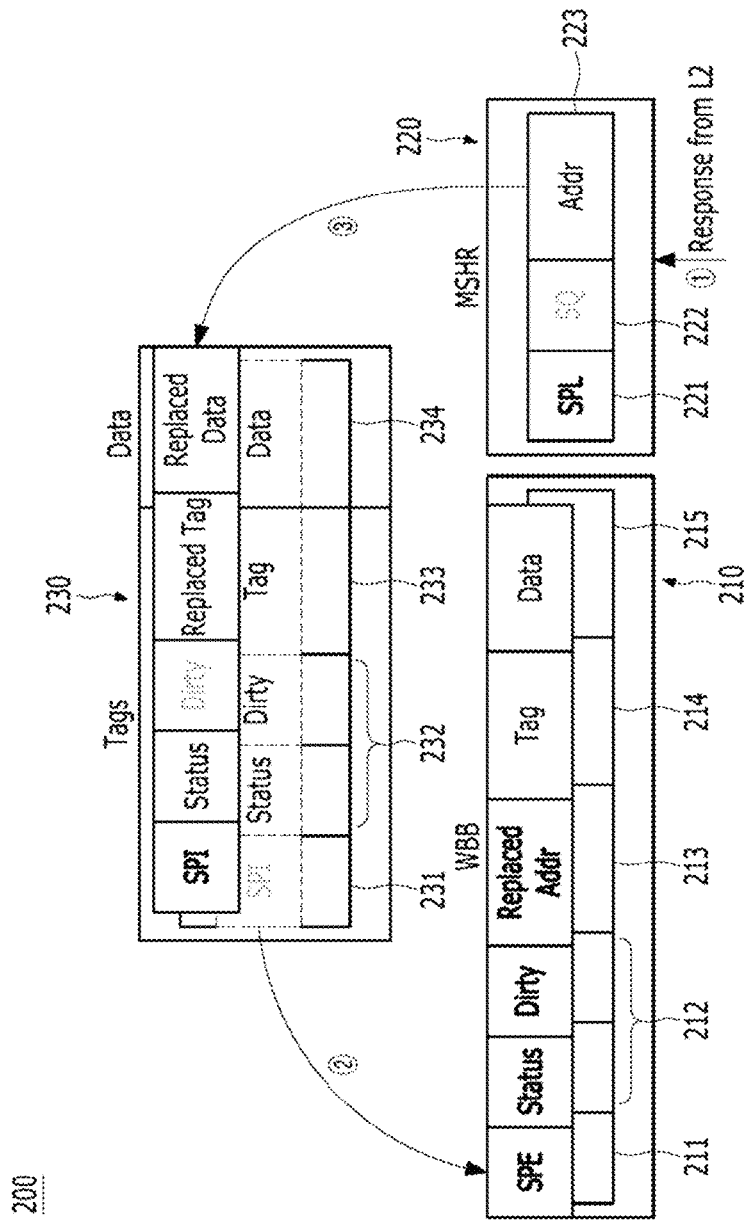
FIG. 4 is a diagram for describing an operation of the L1 cache memory when a request generated by a prediction instruction is returned to the L1 cache memory according to some exemplary embodiments of the present disclosure.

FIG. 4 is a diagram for describing an operation of the L1 cache memory 200 when a request generated by a speculative instruction is returned to the L1 cache memory 200 according to some exemplary embodiments of the present disclosure.

According to some exemplary embodiments of the present disclosure, the L1 cache memory 200 may store the updated cache block returned t the L1 cache memory 200 at a location of the cache block evicted from the tag and data area 230 of the L1 cache memory 200 according to the request generated by the speculative instruction, and set the SPI 231 for the updated cache block.

Specifically, as described above, the write buffer 210 may store received data according to the request returned to the location of the cache block evicted from the tag and data area 230 of the L1 cache memory 200 as the request generated by the speculative instruction is returned to the L1 cache memory 200. Specifically, when the cache miss occurs in the L1 cache memory 200, the L1 cache memory 200 may request relevant data to the low-level cache, the memory, or the disk. Information on such a request may be stored in the MSHR 220. In this case, the MSHR 220 may set the SPL to indicate that the request generated by the speculative instruction is the request by the speculative instruction. When the request generated by the speculative instruction is returned to the L1 cache memory 200 (see original character #1 in FIG. 4), the MSHR 220 may identify whether the SPL for the relevant request is set. When the SPL for the relevant request is set, the cache block (i.e., evicted cache block) evicted by the relevant request may be stored in the write buffer 210 because the result of the speculative execution is not yet decided (see original character #2 in FIG. 4). In this case, the state data 232, the tag 233, the data 234, etc., stored in the tag and data area 230 may be replaced, and stored in the write buffer 210 (see reference numerals 212, 214, and 215 in FIG. 3). Further, the address value of the tag and data area 230 used by the relevant request may be stored in the write buffer 210 as the replacement address information 213 of the evicted cache block. The replacement address information 213 may be used for restoring the evicted cache block on the tag and data area 230 again as described below. In addition, data received by the returned request may be stored as the updated cache block in the tag and data area 230 at which the evicted cache block is positioned (see original character #3 in FIG. 4). Since the updated cache block is stored according to the request generated by the speculative instruction, the SPI may be set for the updated cache block.

Figure 5:
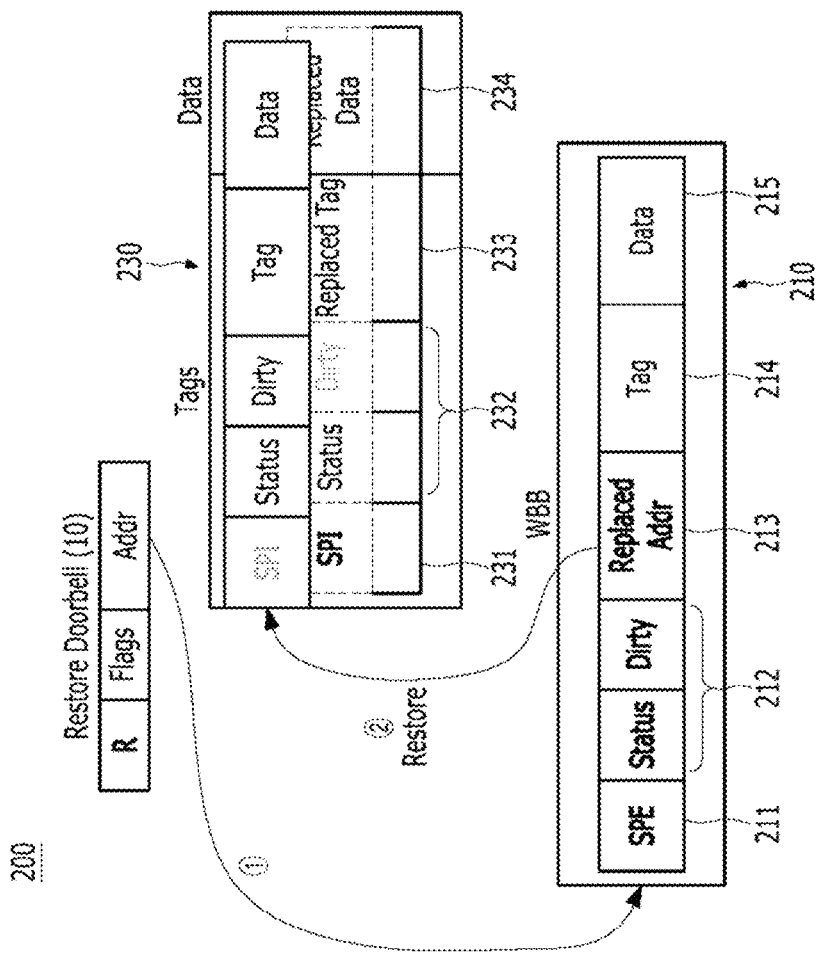
FIG. 5 is a diagram for describing the operation of the L1 cache memory of restoring an evicted cache block according to a restore doorbell signal according to some exemplary embodiments of the present disclosure.

FIG. 5 is a diagram for describing the operation of the L1 cache memory 200 of restoring an evicted cache block according to a restore doorbell signal 10 according to some exemplary embodiments of the present disclosure.

According to some exemplary embodiments of the present disclosure, the write buffer 210 may decide the restore cache block corresponding to the address values of one or more speculative instructions included in the first speculative block among the evicted cache blocks when receiving the restore doorbell signal 10 of the first speculative instruction, and restore the restored cache block to the tag and data area 230 based on the replacement address information 213 of the restored cache block.

The restore operation of the L1 cache memory 200 described herein may be performed when receiving the restore doorbell signal 10 from the load queue 120 (see original character #1 in FIG. 5). When receiving the restore doorbell signal 10, the write buffer 210 may decide the evicted cache block to be restored on the tag and data area 230 by using the address values of one or more speculative instructions included in the first speculative block included in the restore doorbell signal. For convenience, the evicted cache block to be restored may be referred to the restored cache block. Since the address values of one or more speculative instructions included in the first speculative block are an address value of the speculative instruction stored in the evicted cache block, the relevant address values may be used for deciding the restored cache block. When the restored cache block is decided, the L1 cache memory 200 may identify the location at which the restored cache block is stored in the tag and data area 230 before eviction by using the replacement address information 213 of the restored cache block.

According to some exemplary embodiments of the present disclosure, the L1 cache memory 200 may replace the updated cache block corresponding to the replacement address information 213 of the restored cache block with the restored cache block, and release the SPI of the restored cache block, in order to the restored cache block to the tag and data area 230.

When a restore location is identified on the tag and data area 230, the restored cache block is replaced with the updated cache block at a restore location to be restored (see original character #2 in FIG. 5). As a result, since the restored cache block stored in the tag and data area 230 is not the cache block updated by the speculative instruction, the L1 cache memory 200 may release the SPI 231 for the restored cache block.

According to some exemplary embodiments of the present disclosure, when the request generated by the first speculative instruction is not returned to the L1 cache memory at the time when receiving the restore doorbell signal 10 of the first speculative instruction, the L1 cache memory 200 may include a miss status holding register (MSHR) for setting the squash information (SQ) 222 for the first speculative instruction. In addition, the MSHR 220 may ignore the request returned by the first speculative instruction when the squash information (SQ) for the first speculative instruction is set. As described above, the MSHR 220 according to the present disclosure may further include an area storing the squash information (SQ) 222 in the entry. The squash information (SQ) 222 may be used for ignoring the request returned thereafter in order to prevent dual processing when receiving the restore doorbell signal 10 before returning the request generated by the speculative instruction to the L1 cache memory 200.

Specifically, as the cache miss occurs in the L1 cache memory 200, the request generated by the speculative instruction is transmitted to the low-level cache, the memory, or the disk, and then the L1 cache memory 200 may first receive the restore doorbell signal for the speculative block to which the speculative instruction belongs before the relevant request is returned. In this case, since the evicted cache block evicted by the request generated by the speculative instruction on the write buffer 210 is not searched, the MSHR 220 searches whether the speculative instruction related to the relevant request is stored. Since the relevant request is not yet returned, the first speculative instruction related to the relevant request may be stored in the MSHR 220. In this case, the MSHR 220 may set the SQ 222 for the first speculative instruction in order to prevent the dual processing. Since the data received according to the request returned by the first speculative instruction should be invalidated when the SQ 222 is set, the MSHR 220 may ignore the request returned by the first speculative instruction in order to prevent the dual processing.

Figure 6:
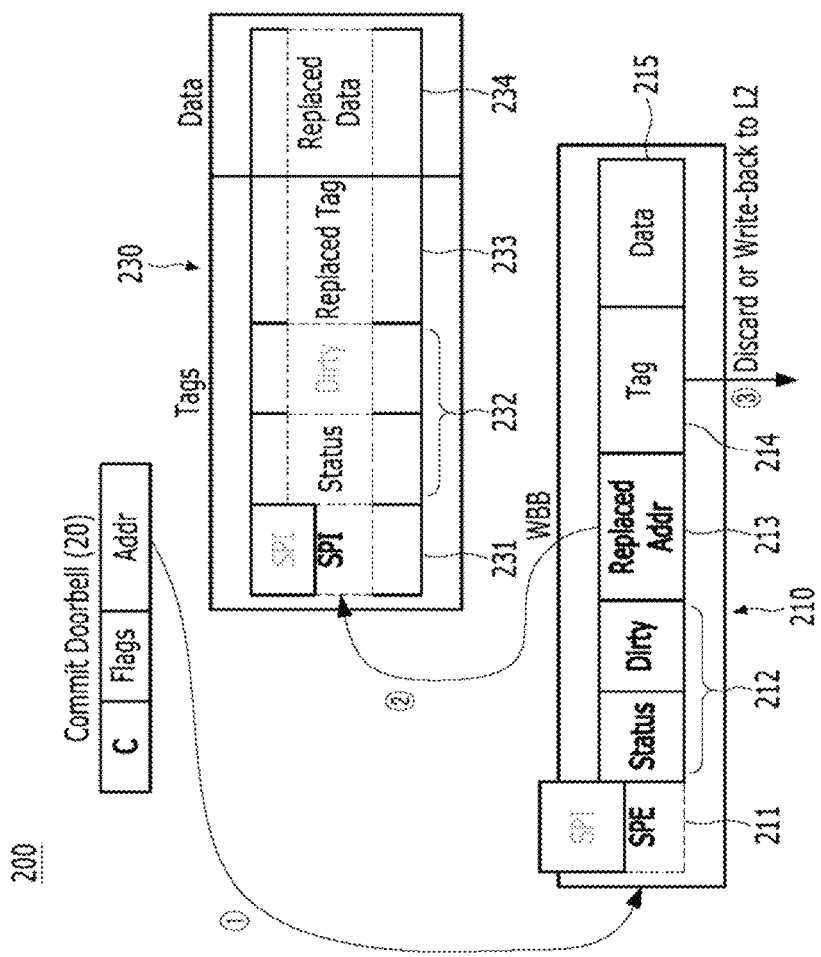
FIG. 6 is a diagram for describing the operation of the L1 cache memory of committing an evicted cache block according to a commit doorbell signal according to some exemplary embodiments of the present disclosure.

FIG. 6 is a diagram for describing the operation of the L1 cache memory 200 of committing an evicted cache block according to a commit doorbell signal 20 according to some exemplary embodiments of the present disclosure.

According to some exemplary embodiments of the present disclosure, the write buffer 210 may decide the committed cache block corresponding to the address values of the one or more speculative instruction included in the first speculative block among the evicted cache blocks when receiving the commit doorbell signal 20 of the first speculative instruction. Further, the L1 cache memory 200 may release the SPI 231 of the updated cache block at the location of the tag and data area 230 corresponding to the replacement address information 213 of the committed cache block.

The commit operation of the L1 cache memory 200 described herein may be performed when receiving the commit doorbell signal 20 from the load queue 120 (see original character #1 in FIG. 6). When receiving the commit doorbell signal 20, the write buffer 210 may decide the evicted cache block to be committed by using the address values of one or more speculative instructions included in the first speculative block included in the commit doorbell signal. For convenience, the evicted cache block to be committed may be referred to the committed cache block. Since the address values of one or more speculative instructions included in the first speculative block are an address value of the speculative instruction stored in the evicted cache block, the address values of the speculative instruction may be used for deciding the committed cache block. A process of deciding the committed cache block may be the same as the process of deciding the restored cache block described in FIG. 5. When the committed cache block is decided, the L1 cache memory 200 may decide the updated cache block to be committed on the tag and data area 230 by using the replacement address information 213 in order to commit the updated cache block stored in the tag and data area 230 as the committed cache block is evicted. Specifically, the replacement address information of the committed cache block may indicate the location of the updated cache block stored as the committed cache block is evicted on the tag and data area 230. Therefore, the replacement address information of the committed cache block may be used for identifying the updated cache block to be committed. When the updated cache block to be committed is decided, the L1 cache memory 200 may release the SPI 231 of the updated cache block corresponding to the replacement address information of the committed cache block. Since the committed cache blocks may not be restored on the tag and data area 230 as receiving the commit doorbell signal, the SPI 231 of the updated cache block may be released for committing (see original character #2 in FIG. 6).

According to some exemplary embodiments of the present disclosure, the write buffer 210 may release the SPE 211 of the committed cache block when the state data 212 of the committed cache block is set to 'clean' and invalidate the committed cache block when the state data 212 of the committed cache block is set to 'dirty'.

As described above, the committed cache blocks should not be restored on the tag and data area 230 again. In this case, the committed cache block may be processed according to the state data (see original character #3 in FIG. 6). Specifically, when the state data of the committed cache block is set to 'dirty', the committed cache block may be left in the write buffer 210 as it is. In addition, the write buffer 210 may release the SPE 211 of the committed cache block. In this case, since the committed cache block is not the cache block evicted by the speculative instruction any longer, the committed cache block may be processed according to the conventional operation of the write buffer 210. For example, the committed cache block may be updated to the low-level cache. Further, in the write buffer 210, when the state data of the committed cache block is set to 'clean', the committed cache block may be removed from the write buffer 210. A space from which the committed cache block is removed may be allocated to a space for another cache block.

When entries of all write buffers 210 are occupied, a space capable of storing the evicted cache block is insufficient when more cache misses occur, so the processor 1000 according to some exemplary embodiments of the present disclosure may temporarily stop performing a load instruction. Therefore, since a situation in which the write buffer 210 overflows does not occur, the processor according to the present disclosure may not be vulnerable to the cache side-channel attack of improving a scheme such as PRIME+PROBE. In addition, when a free space is generated according to a buffer operation of the conventional write buffer 210, the processor 1000 may resume performing the load instruction.

Figure 7:
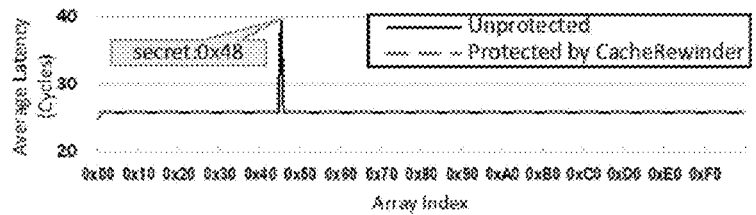
FIG. 7 illustrates a security evaluation of the processor according to some exemplary embodiments of the present disclosure.

Referring to FIG. 7, it can be seen that the processor 1000 of the present disclosure may effectively defend the transient execution attack. In the conventional processor, there is a part where an average latency rapidly rises due to the transient execution attack, and in this case, data may be seized. Unlike this, it can be seen that the processor 1000 according to the present disclosure may maintain a predetermined numerical value without the part where the average latency rapidly rises.

Figure 8:
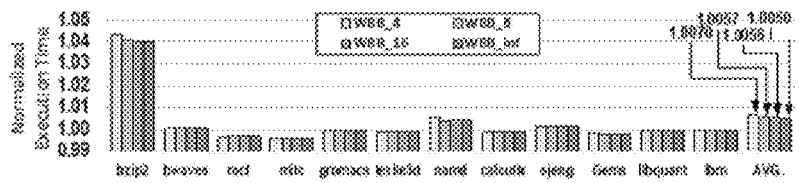
FIG. 8 illustrates a performance evaluation of the processor according to some exemplary embodiments of the present disclosure.

Referring to FIG. 8, when the state change of the cache memory is restored by the processor 1000 of the present disclosure, very low overhead (approximately 0.5 to 0.7%) occurs. Further, FIG. 8 shows that a size of the write buffer occupies a small ratio in performance evaluation.

Figure 9:
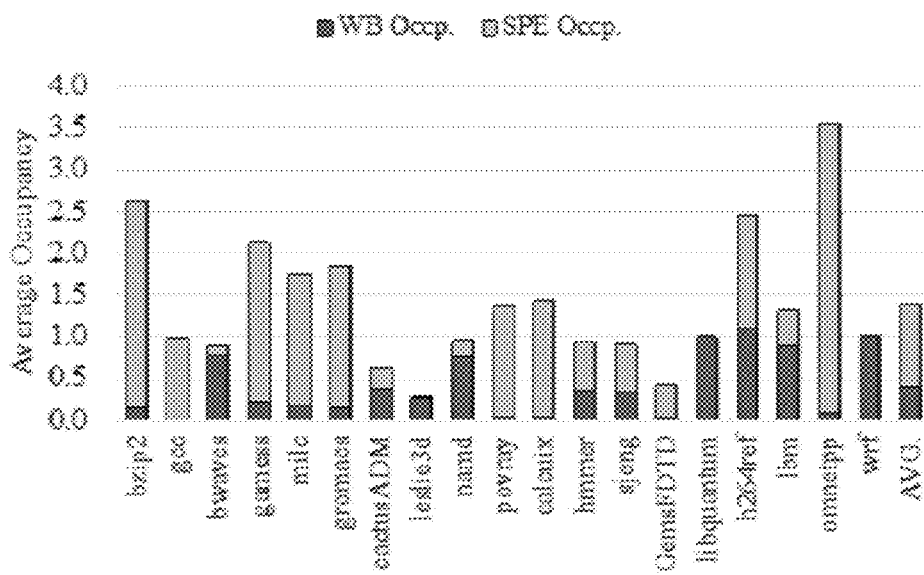
FIG. 9 illustrates a utilization rate of WBB of the processor according to some exemplary embodiments of the present disclosure.

Referring to FIG. 9, it can be seen that a utilization rate of the write buffer 210 increases by approximately 0.98 on average in the processor 1000 of the present disclosure.

Consequently, the present disclosure may present an architectural solving method for effectively defending conventional transient execution attacks by utilizing remaining spaces which are not utilized in the write-back buffer as a space for restoring a state of the cache memory according to speculative execution.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A processor for performing a speculative execution for an out-of-order execution, the processor comprising:
a core; and
an L1 cache memory,
wherein the core includes
a speculative track buffer (STB) storing speculative track information in order to track a speculative instruction when the speculative instruction is recorded in a reorder buffer (ROB), and
a load queue (LQ) transmitting a commit doorbell signal or a restore doorbell signal for a first speculative block to which a first speculative instruction belongs to the L1 cache memory based on first speculative track information of the first speculative instruction when a speculative success or a speculative failure of the first speculative instruction included in the speculative instruction is decided, and
the L1 cache memory includes a write buffer, and
the write buffer stores an evicted cache block evicted from a tag and data area of the L1 cache memory as a request generated by the speculative instruction is returned to the L1 cache memory, and performs a commit operation or a restore operation for the evicted cache block corresponding to the first speculative block when receiving a commit doorbell signal or a restore doorbell signal for the first speculative block.

2. The processor of claim 1, wherein the write buffer sets speculative instruct eviction information (SPE), state data information, and replacement address information of the evicted cache block when storing the evicted cache block.

3. The processor of claim 2, wherein when the speculative failure of the first speculative instruction is decided, the load queue transmits a restore doorbell signal including address values of one or more speculative instructions included in the first speculative block to the L1 cache memory.

4. The processor of claim 3, wherein the write buffer decides a restored cache block corresponding to the address values of one or more speculative instructions included in the first speculative block among the evicted cache blocks when receiving the restore doorbell signal of the first speculative instruction, and restores the restored cache block to the tag and data area based on the replacement address information of the restored cache block.

5. The processor of claim 4, wherein the L1 cache memory stores an updated cache block returned to the L1 cache memory in a location of the cache block evicted from the tag and data area of the L1 cache memory according to the request generated by the speculative instruction, sets speculative instruction update information (SPI) for the updated cache block, replaces the updated cache block corresponding to the replacement address information of the restored cache block with the restored cache block in order to restore the restored cache block to the tag and data area, and release the SPI of the restored cache block when receiving the restore doorbell signal for the first speculative block.

6. The processor of claim 5, wherein the L1 cache memory includes a miss status holding register (MSHR) setting squash information (SQ) for the first speculative instruction when the request generated by the first speculative instruction is not returned to the L1 cache memory at the time of receiving the restore doorbell signal of the first speculative instruction.

7. The processor of claim 6, wherein the MSHR ignores the request returned by the first speculative instruction when the SQ for the first speculative instruction is set.

8. The processor of claim 3, wherein when the speculative success of the first speculative instruction is decided, the speculative track buffer decides whether a valid bit of the first speculative instruction is set when receiving a commit signal for the first speculative instruction from the reorder buffer, and transmits identification information of the first speculative instruction to the load queue when the valid bit of the first speculative instruction is set, and
the load queue transmits the commit doorbell signal including the address values of one or more speculative instructions included in the first speculative block to the L1 cache memory when receiving the identification information of the first speculative instruction.

9. The processor of claim 8, wherein the load queue transmits the commit doorbell signal when speculative instruction load information (SPL) of one or more speculative instructions included in the first speculative block is set.

10. The processor of claim 9, wherein the write buffer decides the committed cache block corresponding to the address values of one or more speculative instructions included in the first speculative block among the evicted cache blocks when receiving the commit doorbell signal of the first speculative instruction, and
the L1 cache memory releases SPI of an updated cache block at a location of the tag and data area corresponding to the replacement address information of the committed cache block.

11. The processor of claim 10, wherein the write buffer invalidates the committed cache block when state data of the committed cache block is set to 'clean' or releases the SPE of the committed cache block when the state data of the committed cache block is set to 'dirty'.

12. The processor of claim 1, wherein the write buffer is a write-back buffer.

* * * * *